United States Patent [19]

Hrubes

[11] Patent Number: 4,611,668

[45] Date of Patent: Sep. 16, 1986

[54] ASSEMBLY FOR FORMING WATER RETAINING POCKETS AND LEVELLING THE GROUND SURFACE

[76] Inventor: James J. Hrubes, Rte. 1, Box 45, Lindsay, Mont. 59339

[21] Appl. No.: 662,451

[22] Filed: Oct. 17, 1984

[51] Int. Cl.⁴ .............................................. A01B 35/16
[52] U.S. Cl. .................................... 172/134; 172/555; 172/184; 172/549
[58] Field of Search .................. 172/531, 604, 555, 1, 172/440, 557, 535, 549, 548, 550, 134

[56] References Cited

U.S. PATENT DOCUMENTS

| | | | |
|---|---|---|---|
| 128,588 | 7/1872 | Bussell | 172/557 X |
| 1,878,142 | 9/1932 | Hjermstad | 172/549 |
| 2,029,872 | 2/1936 | Johnson | 172/555 X |
| 2,164,214 | 6/1939 | Lindgren | 172/604 |
| 2,229,746 | 1/1941 | Krause | 172/555 X |
| 2,252,383 | 8/1941 | Lindgren | 172/555 |
| 2,282,984 | 5/1942 | Maresch | 172/555 |
| 3,224,392 | 12/1965 | Mellen | 172/440 |
| 3,396,802 | 8/1968 | Scranton | 172/604 |
| 3,744,441 | 7/1973 | Smith | 172/604 |

FOREIGN PATENT DOCUMENTS

| | | | |
|---|---|---|---|
| 125231 | 9/1947 | Australia | 172/555 |
| 144588 | 3/1951 | Australia . | |

Primary Examiner—Richard J. Johnson
Attorney, Agent, or Firm—Harvey B. Jacobson

[57] ABSTRACT

An assembly for attachment to a tractor having rotatable elements which will form water collecting and retaining pockets in the ground surface being traversed thereby preventing or reducing water erosion, wind erosion and retaining water for penetration into the soil. The assembly also includes a leveller assembled in front of the tractor to level the uneven terrain created by a previous formation of water retaining pockets. The assembly for forming water retaining pockets includes a plurality of disc-like elements having a substantially semi-circular cut-out to form a pair of diametrically opposed concave soil penetrating, cutting and lifting elements rotatable about an axis inclined in relation to the direction of travel so that water retaining pockets will be formed in the ground surface at regular intervals and the soil that is removed to form the pockets will be dumped on the ground surface adjacent the pockets thus resulting in bumps or humps. The leveller is a disc assembly mounted forwardly of the tractor to level the bumps or humps previously formed during a water pocket forming procedure so that the tractor and operator as well as the water pocket forming assembly will not be adversely affected by the previously formed bumps or humps.

4 Claims, 5 Drawing Figures

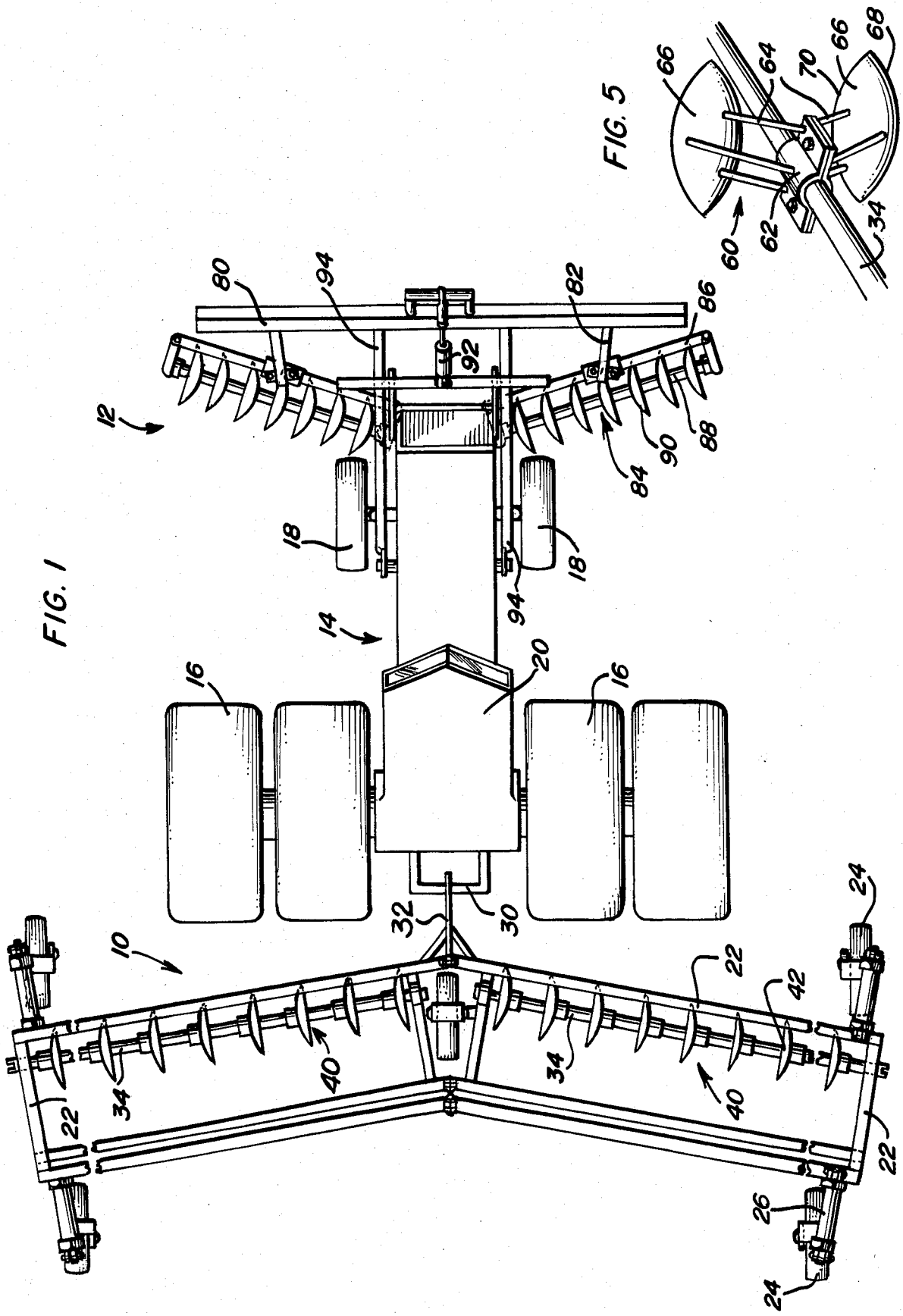

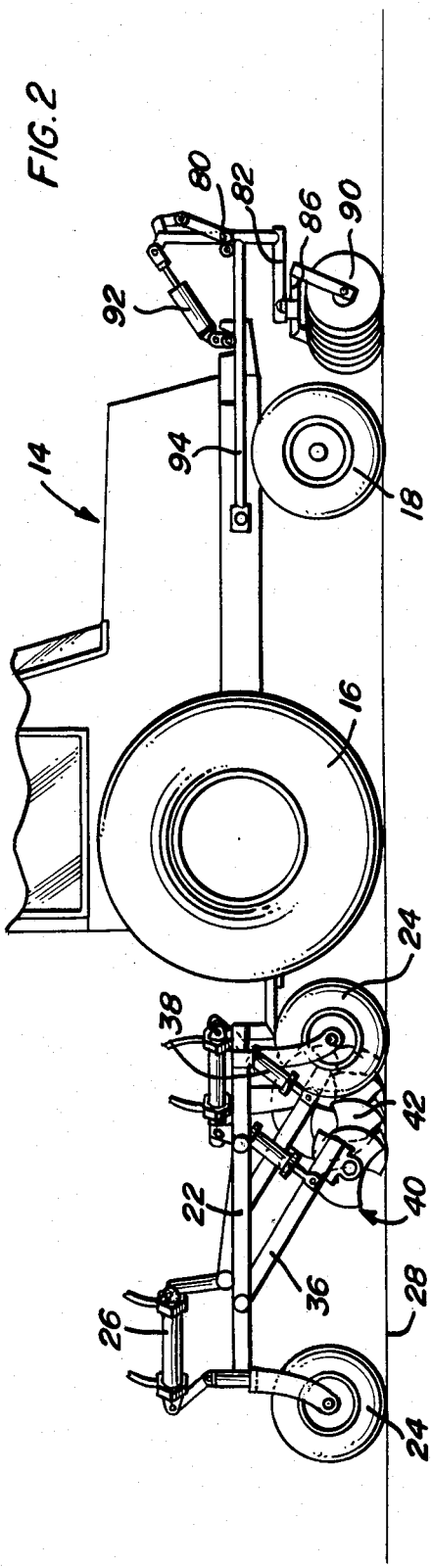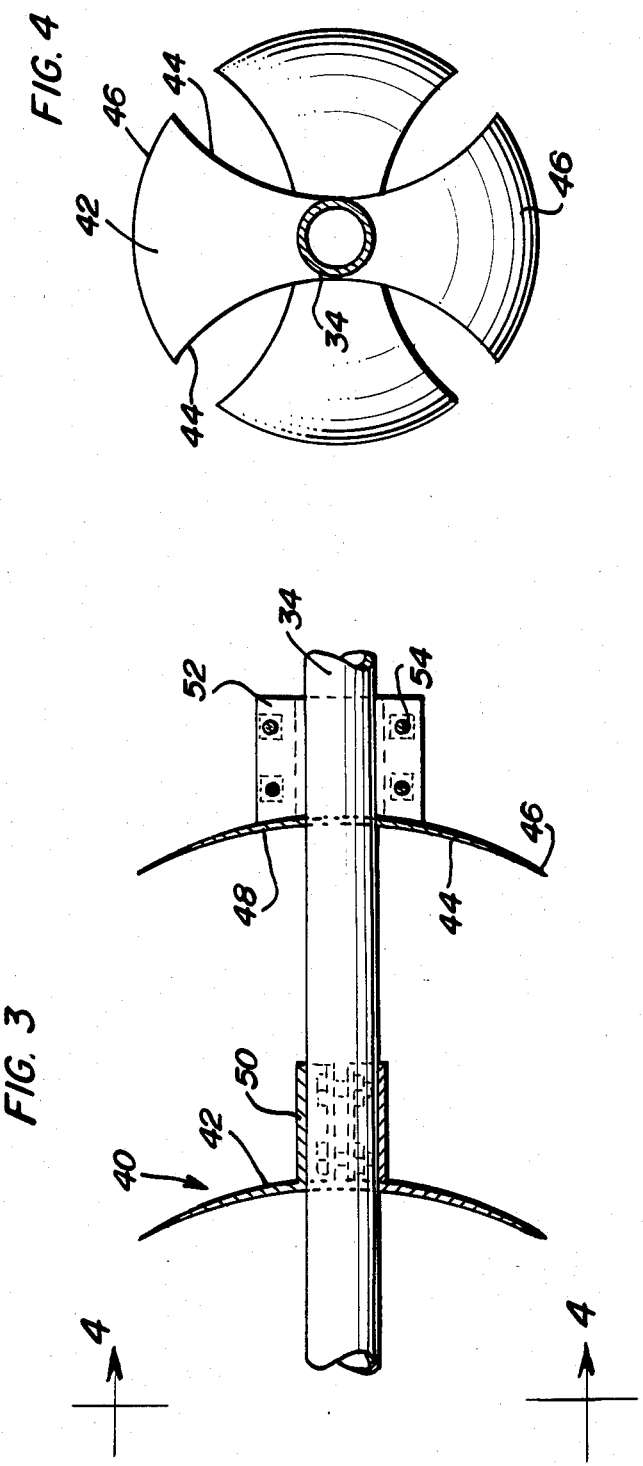

ASSEMBLY FOR FORMING WATER RETAINING POCKETS AND LEVELLING THE GROUND SURFACE

BACKGROUND OF THE INVENTION

1. Field of the Invention

The present invention generally relates to farm implements and more particularly a tractor attached assembly for forming water retaining pockets at a regular interval in the ground surface together with a levelling assembly attached to the tractor so that the levelling assembly precedes the tractor and water retaining pocket forming assembly to eliminate the necessity of the tractor and water retaining pocket forming assembly traversing uneven terrain. The levelling assembly is a disc assembly and the water retaining pocket forming assembly includes concave ground engaging elements rotatable about axes inclined in relation to the direction of travel of the tractor with the ground engaging elements in one embodiment being a disc with generally semi-circular cut-outs at diametrically opposed points and in another embodiment being a pair of concave members having curved edges supported by support arms at diametrically opposed points in relation to the inclined axis of rotation to form a regular pattern of pockets in the ground surface for collecting and retaining water thereby reducing water and wind erosion and enabling better penetration of the water into the soil.

2. Description of the Prior Art

Many efforts have been made to collect and retain water when there is an excess of water such as during a hard rain, when the snow cover melts and the like to provide better penetration of the moisture into the soil and also to reduce erosion of the soil. Previous efforts include the provision of devices to form a plurality of independent and unconnected recesses or pockets in the ground surface to collect and retain excess water. The following U.S. patents are relevant to such devices:

| 2,029,872 | O. B. Johnson | Feb. 4, 1936 |
| 3,101,789 | M.D. Jennings | Aug. 27, 1963 |
| 3,963,078 | C. van der Lely | June 15, 1976 |
| 3,993,144 | J. W. Moreland, Jr. | Nov. 23, 1976 |
| 4,256,184 | J. W. Squibb | Mar. 17, 1981 |

SUMMARY OF THE INVENTION

An object of the present invention is to provide a farm implement attached to a tractor which includes a trailing assembly for forming a plurality of water retaining pockets in the ground surface and a levelling assembly located forwardly of the tractor for levelling the ground surface prior to the tractor and water retaining pocket forming assembly traversing that surface so that the tractor, the operator thereof and the trailing assembly will have a substantially smooth surface to traverse.

Another object of the invention is to provide an assembly for forming water retaining pockets in the ground surface which includes a supporting frame, either wheel supported or supported from the tractor, which supports a plurality of rotatable water retaining pocket forming members or gougers for rotation about inclined axes in relation to the direction of travel in order to form a plurality of regularly spaced pockets in the ground surface.

A further object of the invention is to provide an assembly in accordance with the preceding objects in which the water retaining pocket forming member is a concave disc having semi-circular or half moon cut-outs in diametrically opposed edges to form a pair of diametrically opposed concave ground penetrating, cutting and lifting elements to form pockets in the ground surface during the forward movement of the assembly with the soil removed to form the pockets being deposited on the ground surface adjacent the pocket.

Still another object of the invention is to provide a water retaining pocket forming member in the form of a concave member having an arcuately curved outer edge supported by diametrically opposed arms for rotation about an inclined axis in relation to the direction of travel of the tractor to form pockets in the ground surface with the soil removed from the ground to form the pockets being deposited on the ground surface adjacent the pockets.

A still further object of the invention is to provide an assembly in accordance with the preceding objects in which the leveller is in the form of a disc assembly located forwardly of the tractor for engaging and levelling piles of soil forming humps or bumps that were formed during a previous water retaining pocket forming operation thereby enabling the tractor, operator and implements attached thereto to traverse a relatively smooth surface for more efficient operation and more comfortable operation for the operator.

Yet another object of the present invention is to provide a farm implement assembly in accordance with the preceding objects which is efficient in operation, easy to install in relation to a tractor, dependable and long lasting and requiring little maintenance but yet effectively forming water retaining pockets at regular intervals in the ground surface.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a top plan view of the assembly of the present invention illustrating schematically the orientation of the levelling assembly forwardly of the tractor and the water retaining pocket forming assembly rearwardly of the tractor.

FIG. 2 is an elevational view of the construction of FIG. 1.

FIG. 3 is an enlarged sectional view of a pair of the water retaining pocket forming members illustrating the structure and association thereof.

FIG. 4 is an elevational view along reference line 4—4 of FIG. 3 illustrating the association of the pair of pocket forming members.

FIG. 5 is a perspective view of a second embodiment of the pocket forming members.

DESCRIPTION OF THE PREFERRED EMBODIMENTS

Referring now specifically to the drawings, the assembly for forming water retaining pockets is generally designated by reference numeral 10 and the assembly for levelling the ground surface is generally designated by reference numeral 12 with both assemblies being attached to a conventional farm tractor 14 having the usual rear driving wheels 16, front steerable wheels 18, and operator's cab 20 with the levelling assembly 12 being attached forwardly of the tractor and the water retaining pocket forming assembly 10 being attached rearwardly of the tractor.

The assembly 10 for forming water retaining pockets includes a supporting frame 22 constructed of rigid pipe components welded together or other equivalent structural members rigidly affixed to form a generally elongated, rectangular frame in which the portions of the frame to either side of the center are inclined rearwardly as illustrated in FIG. 1. The frame 22 is supported by a plurality of ground engaging wheels 24 which may be in the form of caster wheels and which can be vertically adjusted by a hydraulic mechanism 26 in order to raise and lower the frame 22 in relation to the ground surface 28. The frame 22 is connected to the tractor draw bar 30 by a suitable hitch assembly 32 all of which represent conventional farm implement construction. Supported horizontally below the frame 22 is a pair of elongated supporting axles 34 which, as illustrated in FIG. 1, are inclined in relation to the direction of travel of the tractor 14. The axles 34 are supported from depending support members 36 pivotally attached to the frame 22 and being raised and lowered by hydraulic mechanisms 38 to vary the elevation of the axles 34 in relation to the ground surface 28. Mounted on the axle 34 is a plurality of ground engaging members 40 each of which is in the form of a circular, concave disc 42 having partial circular cut-outs 44 formed therein thus leaving a pair of diametrically opposed arcuately curved edges 46 which were part of the original disc prior to the cut-outs 44 being formed therein. As illustrated, the cut-outs 44 are diametrically opposed and the arcuate curved edges 46 are diametrically opposed so that when the edges 46 engage the ground surface, the edges 46 will penetrate the ground surface, cut the ground surface with the concave surface of the member 46, as designated by numeral 48, facing inwardly and forwardly due to the inclination of the axle 34 thereby gouging into and cutting into the ground surface and forming a pocket therein in a manner similar to a conventional disc element. However, due to the cut-outs 44, the normally continuous trench formed by a disc having a continuous edge will be interrupted thus forming a plurality of regularly spaced pockets in the ground surface 28. The water retaining pocket forming members 40 are secured to the axle 34 by semi-cylindrical flange members 50 having outwardly extending flanges 52 receiving clamping bolts 54 therethrough for removably and adjustably securing the pocket forming elements 40 to the axle 34 for rotation along with the axles 34 about axes which are inclined outwardly and to the rear in relation to the direction of travel of the tractor 14.

FIG. 5 illustrates a modified embodiment of the pocket forming members generally designated by numeral 60 which includes an attaching sleeve 62 similar to that illustrated in FIG. 3 with a plurality of diametrically opposed outwardly extending support rods 64 fixedly attached to the clamping sleeve 62. At the outer ends of each set of arms, there is supported a concave-convex soil engaging element 66 having an arcuate outer edge 68 and an arcuate inner edge 70 with the concave face of the member 66 facing forwardly and inwardly and attached to an axle similar to axle 34. The lighter weight construction of this embodiment of the invention enables it to be supported directly on the rear beam of a tool bar such as is used on most farms for weed tillage thereby eliminating the necessity of providing ground supporting wheels and the attendant expense of the wheels and the hydraulic adjustment mechanism. Thus, the water retaining pocket forming assembly can be supported directly from the tool bar and hitch mechanism of a conventional tractor and vertically adjustable by using the conventional hydraulic lift system on the farm tractor which can be used to raise and lower the tool bar and ultimately the water retaining pocket forming members 66 thereby providing a less expensive arrangement with the depth of penetration of the ground engaging members 66 being varied by using the hydraulic system of the tractor.

The levelling assembly 12 includes a supporting framework 80 attached to and straddling the front end of the tractor in a conventional manner and including support elements 82 for supporting gang disc assemblies generally designated by numeral 84. Each disc assembly 84 includes a subframe 86 with an axle 88 supported therefrom and a plurality of concave-convex circular discs 90 supported in a conventional manner with the axis of rotation of the disc 90 being forwardly and outwardly inclined in relation to the path of movement of the tractor with the disc elements being oriented so that the ground surface in front of the tractor wheels will be levelled. The elevation of the disc can be varied by a conventional hydraulic mechanism 92 and the frame 80 includes attaching arms 94 connected to the tractor in a conventional manner so that the gang disc assemblies 84 are mounted forwardly of the tractor wheels and level a path of movement for the tractor so that the tractor and its operator as well as the assembly 10 will be able to perform more efficiently with less discomfort to the tractor operator and less maintenance of the equipment.

The pocket forming assembly 10 may be constructed in 10-ft. sections with the axles 34 being 3 inch heavy pipe with end bearings which allows the members 40 to be easily adjusted with respect to the space between them. The pockets formed are approximately 3 feet apart and each pocket may have a capacity of approximately 10 gallons of water in order to perform satisfactorily. A drag-type leveller may also be used in some instances depending upon the nature of the humps or bumps formed by forming pockets in the ground surface during a previous pocket forming procedure.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An assembly for forming water retaining pockets in the ground surface comprising a supporting frame, means connecting the frame to a tractor for moving the frame in a path of movement over the ground surface in which pockets are to be formed, a plurality of pocket forming members supported below the frame, means rotatably supporting the pocket forming members for rotation about an axis inclined in relation to the direction of movement of the assembly, each pocket forming member comprising a pair of diametrically opposed, circumferentially spaced blade-like soil cutting and lifting members forming a regular pattern of spaced pockets in the ground, each pocket forming member including sets of support rods extending on diametrically opposite sides of the rotatable member, each with a concave-convex plate spaced from the rotatable member and with an arcuate inner and outer edge supported from each set of rods for engaging and lifting the soil to form a pocket and discharge the soil adjacent the pocket.

2. The assembly as defined in claim 1 together with a levelling assembly, means mounting the levelling assembly forwardly of the tractor for smoothing the ground surface in front of the tractor when forming water retaining pockets.

3. In combination with a tractor having ground engaging support and driving means by which the tractor can be driven on a ground surface, an assembly for forming water retaining pockets in the ground surface being traversed by the tractor comprising a supporting assembly connected to the rear of a tractor for movement in a path of movement over the ground surface in which pockets are to be formed, a plurality of pairs of pocket forming members supported from the supporting assembly, means rotatably supporting the pocket forming members for rotation about an axis inclined in relation to the direction of movement of the assembly, said means rotatably supporting the pocket forming members including an axle oriented in inclined relation to the path of movement, each pair of pocket forming members comprising a pair of diametrically opposed concave-convex plates, a plurality of rods extending from the convex side of each plate and being secured to the axle and supporting the concave surface of the plate facing in the direction of travel of the tractor, each plate being generally oval-shaped with an arcuate outer and inner edge with the long axis of the plate being generally tangential to the circular path of movement of the plates during rotation, adjacent pairs of pocket forming members being angularly staggered for rotating the pocket forming members about the inclined axis of the axle by successive contact with the ground surface with the arcuate outer edge of the plate cutting into the ground surface and lifting a quantity of soil upwardly and discharging it laterally to form rows of spaced pockets in the ground surface, said plurality of rods being spaced from each other to permit passage of soil therethrough.

4. The combination as defined in claim 3 together with levelling means mounted forwardly of the tractor and including ground agitating and levelling members oriented in alignment with the ground engaging means on the tractor to level previously pocketed ground surface prior to the tractor traversing said surface.

* * * * *